(12) United States Patent
Sato et al.

(10) Patent No.: US 12,176,538 B2
(45) Date of Patent: Dec. 24, 2024

(54) ALL SOLID BATTERY

(71) Applicant: TAIYO YUDEN CO., LTD., Tokyo (JP)

(72) Inventors: Takato Sato, Tokyo (JP); Daigo Ito, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 480 days.

(21) Appl. No.: 17/035,002

(22) Filed: Sep. 28, 2020

(65) Prior Publication Data
US 2021/0135196 A1 May 6, 2021

(30) Foreign Application Priority Data
Oct. 30, 2019 (JP) .................................. 2019-197374

(51) Int. Cl.
*H01M 4/58* (2010.01)
*H01M 4/485* (2010.01)
(Continued)

(52) U.S. Cl.
CPC ......... *H01M 4/5825* (2013.01); *H01M 4/485* (2013.01); *H01M 10/0525* (2013.01);
(Continued)

(58) Field of Classification Search
None
See application file for complete search history.

(56) References Cited

U.S. PATENT DOCUMENTS

2012/0077093 A1  3/2012  Matsuda et al. ............... 429/309
2012/0276439 A1  11/2012 Fujita et al. ................... 429/149
(Continued)

FOREIGN PATENT DOCUMENTS

CN  102754269 A  10/2012
CN  103988346 A  8/2014
(Continued)

OTHER PUBLICATIONS

Notice of Reasons for Refusal issued on Jul. 25, 2023 in a counterpart Japanese Patent Application No. 2019-197374.
(Continued)

*Primary Examiner* — Laura Weiner
(74) *Attorney, Agent, or Firm* — Stein IP LLC

(57) ABSTRACT

An all solid battery includes a solid electrolyte layer, a positive electrode layer that includes a positive electrode active material and a negative electrode active material, and a negative electrode layer that includes a positive electrode active material and a negative electrode active material, wherein a relationship "$S_{Cathode} > S_{Anode}$" is satisfied, when a ratio of the positive electrode active material of the positive electrode layer is a ratio $A_1$, a ratio of the negative electrode active material of the positive electrode layer is a ratio $B_1$, a ratio of the positive electrode active material of the negative electrode layer is a ratio $A_2$, a ratio of the negative electrode active material of the negative electrode layer is a ratio $B_2$, $S_{Cathode}$ is $A_1/(A_1+B_1)$, and $S_{Anode}$ is $A_2/(A_2+B_2)$.

4 Claims, 5 Drawing Sheets

(51) Int. Cl.
*H01M 10/0525* (2010.01)
*H01M 10/0562* (2010.01)
*H01M 4/587* (2010.01)

(52) U.S. Cl.
CPC ........ *H01M 10/0562* (2013.01); *H01M 4/587* (2013.01); *H01M 2300/0071* (2013.01)

(56) References Cited

U.S. PATENT DOCUMENTS

| | | | |
|---|---|---|---|
| 2013/0017435 A1 | 1/2013 | Sato et al. | 429/158 |
| 2014/0080006 A1 | 3/2014 | Ogasa | 429/319 |
| 2014/0329118 A1 | 11/2014 | Nagase et al. | H01M 10/0585 |
| 2019/0131616 A1* | 5/2019 | Tomizawa | H01M 4/364 |
| 2019/0341621 A1 | 11/2019 | Masuko et al. | H01M 4/628 |
| 2020/0091522 A1* | 3/2020 | Ito | H01M 4/5805 |

FOREIGN PATENT DOCUMENTS

| | | | |
|---|---|---|---|
| CN | 109755631 A | | 5/2019 |
| CN | 110268572 A | | 9/2019 |
| JP | 2007-258165 | * | 10/2007 |
| JP | 2011-198692 A | | 10/2011 |
| JP | 2011-216235 A | | 10/2011 |
| JP | 2015-103437 A | | 6/2015 |
| JP | 2015-220096 A | | 12/2015 |
| JP | 2017-054626 A | | 3/2017 |
| JP | 2019-087346 A | | 6/2019 |
| WO | WO 2012/060349 A1 | | 5/2012 |

OTHER PUBLICATIONS

Office Action issued on Oct. 13, 2023 in a counterpart Chinese Patent Application No. 202011161887.4.

* cited by examiner

ALL SOLID BATTERY

CROSS-REFERENCE TO RELATED APPLICATION

This application is based upon and claims the benefit of priority of the prior Japanese Patent Application No. 2019-197374, filed on Oct. 30, 2019, the entire contents of which are incorporated herein by reference.

FIELD

A certain aspect of the present invention relates to an all solid battery.

BACKGROUND

Recently, secondary batteries are being used in various fields. In many cases, it is required to perform a short-circuit test with respect to each product, from a viewpoint of reliability, safety or the like. The short-circuit test is defined as a test in which an electrical resistance is measured of an object battery, and short-circuit or a factor of short-circuit of the battery is tested. When the secondary batteries are downsized, the short-circuit test may be performed under a condition that polarity of the batteries is incorrect. When the short-circuit test is performed under the condition that the polarity is incorrect, an unexpected movement of carriers occurs. In this case, battery property may be degraded, and the property may be out of management range. And a yielding rate may be degraded because of the short-circuit test. The short-circuit test is usually performed with respect to all of the products. The degradation of the yielding percentage caused by the short-circuit test may be a non-negligible problem.

As a method for improving the degraded yielding percentage caused by the short-circuit test, it is thought that a positive electrode and a negative electrode include both a positive electrode active material and a negative electrode active material, and thereby each of the electrode layers is non-polar (for example, see Japanese Patent Application Publication No. 2011-216235).

SUMMARY OF THE INVENTION

However, the non-polar battery can be mounted regardless of the polarity. Therefore, in the non-polar battery, the ratio of the positive electrode active material is equal to the ratio of the negative electrode active material. In this case, the capacity density may be lower than that of a polar battery.

The present invention has a purpose of providing an all solid battery that is capable of suppressing reduction of a yielding percentage caused by a short-circuit test and suppressing degradation of capacity density.

According to an aspect of the present invention, there is provided an all solid battery including: a solid electrolyte layer of which a main component is oxide-based solid electrolyte; a positive electrode layer that is provided on a first main face of the solid electrolyte layer and includes a positive electrode active material and a negative electrode active material; and a negative electrode layer that is provided on a second main face of the solid electrolyte layer and includes a positive electrode active material and a negative electrode active material, wherein a relationship "$S_{Cathode} > S_{Anode}$" is satisfied, when a ratio of the positive electrode active material of the positive electrode layer is a ratio $A_1$, a ratio of the negative electrode active material of the positive electrode layer is a ratio $B_1$, a ratio of the positive electrode active material of the negative electrode layer is a ratio $A_2$, a ratio of the negative electrode active material of the negative electrode layer is a ratio $B_2$, $S_{Cathode}$ is $A_1/(A_1+B_1)$, and $S_{Anode}$ is $A_2/(A_2+B_2)$.

DETAILED DESCRIPTION

A description will be given of an embodiment with reference to the accompanying drawings.

Embodiment

Figure 1:
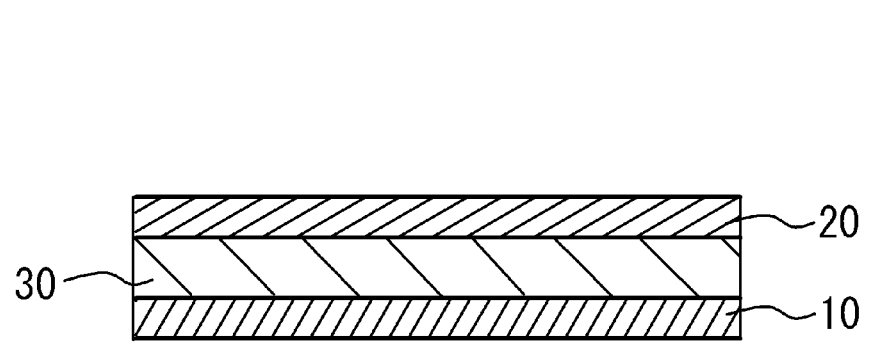
FIG. 1 illustrates a schematic cross section of a basic structure of an all solid battery.

FIG. 1 illustrates a schematic cross section of a basic structure of an all solid battery 100 in accordance with an embodiment. As illustrated in FIG. 1, the all solid battery 100 has a structure in which a positive electrode layer 10 and a negative electrode layer 20 sandwich an oxide-based solid electrolyte layer 30. The positive electrode layer 10 is provided on a first main face of the solid electrolyte layer 30. The negative electrode layer 20 is provided on a second main face of the solid electrolyte layer 30.

At least, the solid electrolyte layer 30 is an oxide-based solid electrolyte. For example, phosphoric acid salt-based electrolyte having a NASICON structure may be used for the solid electrolyte layer 30. The phosphoric acid salt-based solid electrolyte having the NASICON structure has a high conductivity and is stable in normal atmosphere. The phosphoric acid salt-based solid electrolyte is, for example, such as a salt of phosphoric acid including lithium. The phosphoric acid salt is not limited. For example, the phosphoric acid salt is such as composite salt of phosphoric acid with Ti (for example $LiTi_2(PO_4)_3$). Alternatively, at least a part of Ti may be replaced with a transition metal of which a valence is four, such as Ge, Sn, Hf, or Zr. In order to increase an amount of Li, a part of Ti may be replaced with a transition metal of which a valence is three, such as Al, Ga, In, Y or La. In concrete, the phosphoric acid salt including lithium and having the NASICON structure is $Li_{1+x}Al_xGe_{2-x}(PO_4)_3$, $Li_{1+x}Al_xZr_{2-x}(PO_4)_3$, $Li_{1+x}Al_xT_{2-x}(PO_4)_3$ or the like. For example, it is preferable that Li—Al—Ge—$PO_4$-based material, to which a transition metal included in the phosphoric acid salt having the olivine type crystal structure included in the positive electrode layer 10 and the negative electrode layer 20 is added in advance, is used. For example, when the positive electrode layer 10 and the negative electrode layer 20 include phosphoric acid salt including Co and Li, it is preferable that the solid electrolyte layer 30 includes Li—Al—Ge—$PO_4$-based material to which Co is added in advance. In this case, it is possible to suppress solving of the transition metal included in the electrode active material into the electrolyte. When the positive electrode layer 10 and the negative electrode layer 20 include phosphoric acid salt including Li and a transition metal other than Co, it is preferable that the solid electrolyte layer 30 includes Li—Al—Ge—PO$_4$-based material in which the transition metal is added in advance.

At least, the positive electrode layer 10 includes a material having an olivine type crystal structure, as an electrode active material. The negative electrode layer 20 also includes the electrode active material. The electrode active material is such as phosphoric acid salt including a transition metal and lithium. The olivine type crystal structure is a crystal of natural olivine. It is possible to identify the olivine type crystal structure, by using X-ray diffraction.

For example, LiCoPO$_4$ including Co may be used as a typical example of the electrode active material having the olivine type crystal structure. Other salts of phosphoric acid, in which Co acting as a transition metal is replaced to another transition metal in the above-mentioned chemical formula, may be used. A ratio of Li or PO$_4$ may fluctuate in accordance with a valence. It is preferable that Co, Mn, Fe, Ni or the like is used as the transition metal.

The electrode active material having the olivine type crystal structure acts as a positive electrode active material in the positive electrode layer 10. When the negative electrode layer 20 also includes an electrode active material having the olivine type crystal structure, discharge capacity may increase and an operation voltage may increase because of electric discharge, in the negative electrode layer 20. The function mechanism is not completely clear. However, the mechanism may be caused by partial solid-phase formation together with the negative electrode active material.

When both the positive electrode layer 10 and the negative electrode layer 20 include an electrode active material having the olivine type crystal structure, the electrode active material of each of the positive electrode layer 10 and the negative electrode layer 20 may have a common transition metal. Alternatively, the a transition metal of the electrode active material of the positive electrode layer 10 may be different from that of the negative electrode layer 20. The positive electrode layer 10 and the negative electrode layer 20 may have only single type of transition metal. The positive electrode layer 10 and the negative electrode layer 20 may have two or more types of transition metal. It is preferable that the positive electrode layer 10 and the negative electrode layer 20 have a common transition metal. It is more preferable that the electrode active materials of the both electrode layers have the same chemical composition. When the positive electrode layer 10 and the negative electrode layer 20 have a common transition metal or a common electrode active material of the same composition, similarity between the compositions of the both electrode layers increases. Therefore, even if terminals of the all solid battery 100 are connected in a positive/negative reversed state, the all solid battery 100 can be actually used without malfunction, in accordance with the usage purpose.

The negative electrode layer 20 may include known material as the negative electrode active material. In the embodiment, both of the positive electrode layer 10 and the negative electrode layer 20 include the known material as the negative electrode active material. Conventional technology of secondary batteries may be applied to the negative electrode active material. For example, titanium oxide, lithium-titanium complex oxide, lithium-titanium complex salt of phosphoric acid salt, a carbon, a vanadium lithium phosphate. For example, as the negative electrode active material, Li—Al—Ti—PO$_4$-based oxide (Li$_{1+x}$Al$_x$Ti$_{2-x}$(PO$_4$)$_3$ or the like may be sed.

In the forming process of the positive electrode layer 10 and the negative electrode layer 20, moreover, oxide-based solid electrolyte material or a conductive material (conductive auxiliary agent) may be added. When the material is evenly dispersed into water or organic solution together with binder or plasticizer, paste for electrode layer is obtained. A carbon material may be used as the conductive auxiliary agent. A metal material may be used as the conductive auxiliary agent. Pd, Ni, Cu, or Fe, or an alloy thereof may be used as a metal of the conductive auxiliary agent.

Figure 2:
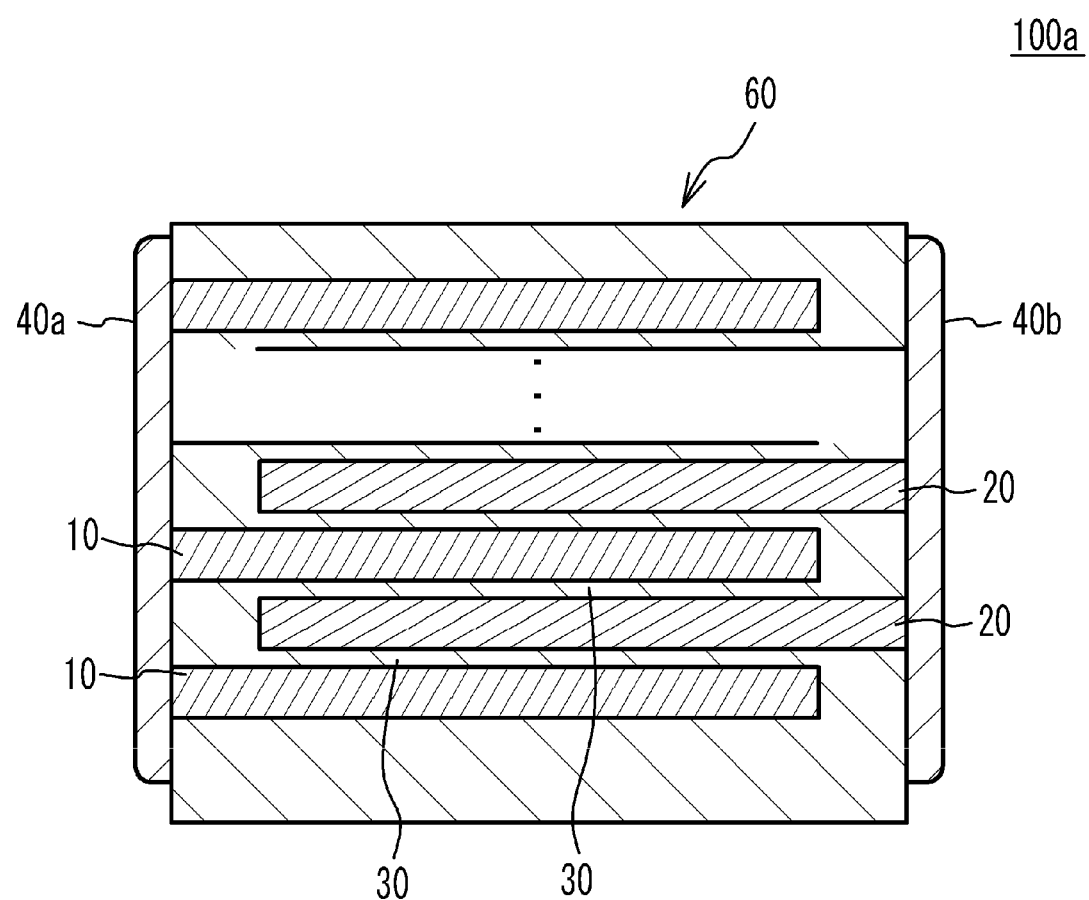
FIG. 2 illustrates a schematic cross section of another all solid battery in which a plurality of cell units are stacked.

FIG. 2 illustrates a schematic cross section of an all solid battery 100a in which a plurality of cell units are stacked. The all solid battery 100a has a multilayer chip 60 having a rectangular parallelepiped shape, a first external electrode 40a provided on a first edge face of the multilayer chip 60, and a second external electrode 40b provided on a second edge face facing with the first edge face.

In four faces other than the two end faces of the multilayer chip 60, two faces other than an upper face and a lower face of the multilayer chip 60 in a stacking direction are referred to as side faces. The first external electrodes 40a and the second external electrode 40b extend to the upper face, the lower face and the two side faces of the multilayer chip 60. However, the first external electrode 40a and the second external electrode 40b are spaced from each other.

In the following description, the same numeral is added to each member that has the same composition range, the same thickness range and the same particle distribution range as that of the all solid battery 100. And, a detail explanation of the same member is omitted.

In the all solid battery 100a, each of the positive electrode layers 10 and each of the negative electrode layers 20 sandwich each of the solid electrolyte layer 30 and are alternately stacked. An electric collector layer of which a main component is metal may not be necessarily provided in a multilayer structure of the positive electrode layer 10, the solid electrolyte layer 30 and the negative electrode layer 20. Edges of the positive electrode layers 10 are exposed to the first edge face of the multilayer chip 60 but are not exposed to the second edge face of the multilayer chip 60. Edges of the negative electrode layers 20 are exposed to the second edge face of the multilayer chip 60 but are not exposed to the first edge face. Thus, each of the positive electrode layers 10 and each of the negative electrode layers 20 are alternately conducted to the first external electrode 40a and the second external electrode 40b. The solid electrolyte layer 30 extends from the first external electrode 40a to the second external electrode 40b. In this way, in the all solid battery 100a, each of stack units of the positive electrode layer 10, the solid electrolyte layer 30 and the negative electrode layer 20 and each of stack units of the negative electrode layer 20, the solid electrolyte layer 30 and the positive electrode layer 10 are alternately repeated. Therefore, the all solid battery 100a has a structure in which a plurality of cell units are stacked.

It is requested to perform a short-circuit test of the all solid battery 100 and the all solid battery 100a, from a viewpoint of reliability, stability or the like of products. When the all solid battery 100 and the all solid battery 100a are downsized, the all solid batteries may be tested under a condition that polarity is incorrect. When the all solid batteries are tested under the condition that the polarity is incorrect, an unexpected movement of carriers occurs in the all solid batteries. In this case, property of the all solid batteries may be degraded. The property may be out of management range. A yielding percentage may be degraded because of the short-circuit test. The short-circuit test is usually performed with respect to all of the products of the all solid batteries. The degradation of the yielding percentage caused by the short-circuit test may be non-negligible problem.

And so, as a method for improving the degraded yielding percentage caused by the short-circuit test, it is thought that the two electrodes include both the positive electrode active material and the negative electrode active material, and thereby each of the electrode layers is non-polar. However, in the non-polar battery, the ratio of the positive electrode active material is equal to the ratio of the negative electrode active material. In this case, the capacity density may be lower than that of a polar battery.

And so, the all solid battery 100 and the all solid battery 100a have a structure for suppressing the reduction of the capacity density and improving the degraded yielding percentage caused by the short-circuit test.

The positive electrode layer 10 and the negative electrode layer 20 include both the positive electrode active material and the negative electrode active material, in the all solid battery 100 and the all solid battery 100a. Even if the short-circuit test is performed under the condition that the polarity is incorrect, the unexpected movement of carriers is suppressed and the degradation of the battery property is suppressed. It is therefore possible to improve the degraded yielding percentage caused by the short-circuit test.

In the positive electrode layer 10, a ratio of the positive electrode active material is a ratio $A_1$, and a ratio of the negative electrode active material is a ratio $B_1$. In the negative electrode layer 20, a ratio of the positive electrode active material is a ratio $A_2$, and a ratio of the negative electrode active material is a ratio $B_2$. A ratio $S_{Cathode}$ of the positive electrode active material with respect to a total of active materials in the positive electrode layer 10 is expressed as the following formula (1). A ratio $S_{Anode}$ of the positive electrode active material with respect to a total of active materials in the negative electrode layer 20 is expressed as the following formula (2). In the all solid battery 100 and the all solid battery 100a, the $S_{Cathode}$ is different from the $S_{Anode}$, as shown in the following formula (3). As shown in the following formula (4), $S_{Cathode}$ is larger than $S_{Anode}$.

$$S_{Cathode}=A_1/(A_1+B_1) \tag{1}$$

$$S_{Anode}=A_2/(A_2+B_2) \tag{2}$$

$$S_{Cathode} \neq S_{Anode} \tag{3}$$

$$S_{Cathode} > S_{Anode} \tag{4}$$

When the formula (4) is satisfied, the ratio of the positive electrode active material with respect to the total of the active materials in the positive electrode layer 10 is larger than the ratio of the positive electrode active material with respect to the total of the active materials in the negative electrode layer 20. In the structure, when the all solid battery is mounted with a correct polarity, the capacity density is improved, compared to a case where the ratio of the positive electrode active material is equal to the ratio of the negative electrode active material between two electrode layers ($S_{Cathode}=S_{Anode}$). The ratio $A_1$, the ratio $B_1$, the ratio $A_2$, and the ratio $B_2$ are area ratios with respect to the whole of each electrode layer. The area ratio may be an area ratio of a cross section in the stacking direction.

In the embodiment, it is possible to suppress degradation of the yielding percentage caused by the short-circuit test, and it is possible to suppress degradation of the capacity density.

It is preferable that $S_{Cathode}>0.6$ is satisfied and $S_{Anode}<0.6$ is satisfied.

It is possible to observe the ratio $A_1$, the ratio $B_1$, the ratio $A_2$ and the ratio $B_2$ by a SEM (Scanning Electron Microscopy)-EDS (Energy Dispersion type X-ray Spectrometer) mapping of the cross sections of the positive electrode layer 10 and the negative electrode layer 20. In concrete, it is possible to measure the ratio $A_1$, the ratio $B_1$, the ratio $A_2$ and the ratio $B_2$ by observing elements of the positive electrode active material and the negative electrode active material.

Figure 3:
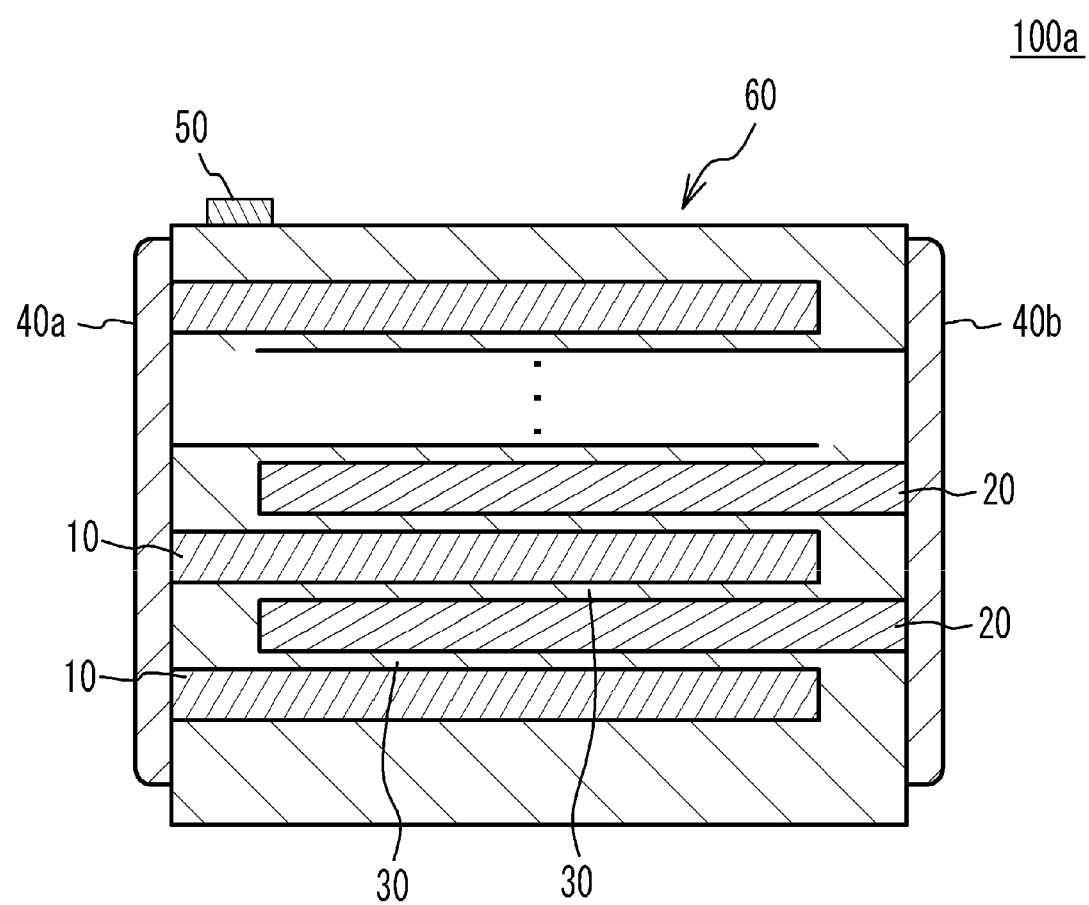
FIG. 3 illustrates a mark.

As illustrated in FIG. 3, it is preferable that a mark 50 for visual identification between the external electrode (first external electrode 40a) for the positive electrode layer 10 and the external electrode (second external electrode 40b) for the negative electrode layer 20, on the surface of the all solid battery 100a. For example, the mark 50 may be provided on the side of the first external electrode 40a. The mark 50 may be provided on the side of the second external electrode 40b.

Figure 4:
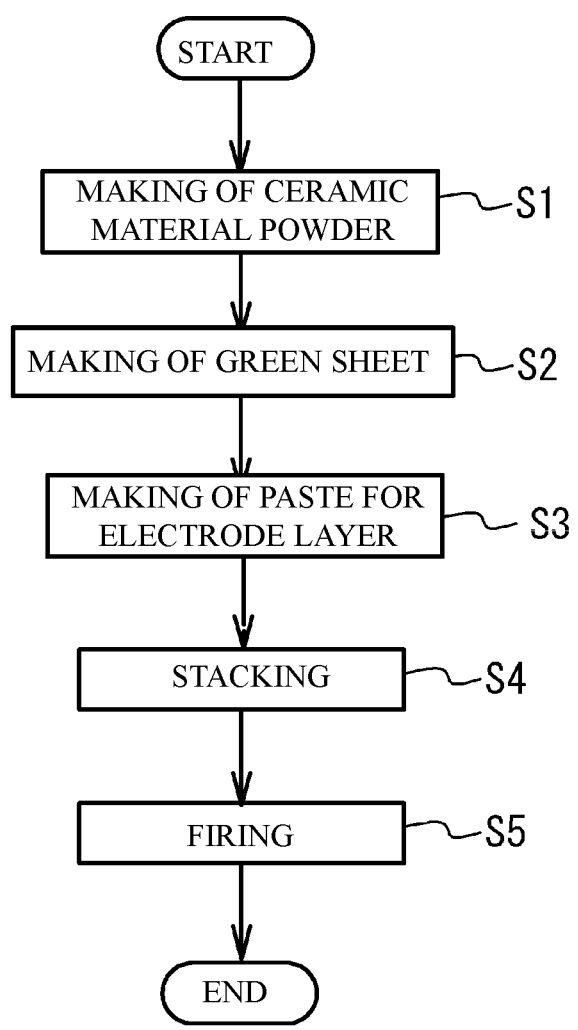
FIG. 4 illustrates a flowchart of a manufacturing method of an all solid battery.

FIG. 4 illustrates a flowchart of the manufacturing method of the all solid battery 100a.

(Making process of ceramic material powder) Oxide-based solid electrolyte powder for forming the solid electrolyte layer 30 is made. For example, it is possible to make the oxide-based solid electrolyte powder for forming the solid electrolyte layer 30, by mixing raw material and additives and using solid phase synthesis method or the like. The resulting powder is subjected to dry grinding. Thus, a grain diameter of the resulting power is adjusted to a desired one. For example, the diameter is adjusted to the desired one with use of planetary ball mil using $ZrO_2$ balls of 5 mmφ.

The additives include sintering assistant. The sintering assistant may include one or more glass components such as Li—B—O-based compound, Li—Si—O-based compound, Li—C—O-based compound, Li—S—O-based compound, or Li—P—O-based compound.

(Making process of green sheet) The resulting powder is evenly dispersed into aqueous solvent or organic solvent together with a binding agent, a dispersing agent, a plasticizer and so on. The resulting power is subjected wet crushing. And solid electrolyte slurry having a desired particle diameter is obtained. In this case, a bead mill, a wet jet mill, a kneader, a high pressure homogenizer or the like may be used. It is preferable that the bead mill is used because adjusting of particle size distribution and dispersion are performed at the same time. A binder is added to the resulting solid electrolyte slurry. Thus, solid electrolyte paste is obtained. The solid electrolyte paste is painted. Thus, a green sheet is obtained. The painting method is not limited. For example, a slot die method, a reverse coat method, a gravure coat method, a bar coat method, a doctor blade method or the like may be used. It is possible to measure the particle size distribution after the wet-crushing, by using a laser diffraction measurement device using a laser diffraction scattering method.

(Making process of paste for electrode layer) Next, paste for electrode layer is made in order to make the positive electrode layer 10 and the negative electrode layer 20. For example, the electrode active material and the solid electrolyte material are highly dispersed by a bead mil or the like. Thus, ceramic paste only including ceramic particles is made. And, the ceramic paste and board-shaped carbon paste are mixed well.

(Stacking process) With respect to the all solid battery 100 described on the basis of FIG. 1, the paste for electrode layer is printed on both faces of the green sheet. The method of the printing is not limited. For example, a screen printing method, an intaglio printing method, a relief printing method, a calendar roll method or the like can be used as the printing method. It is thought that the screen printing method is a general method from a viewpoint of making a stacked device of which each layer is thin and of which the number of the layers is large. An ink-jet printing may be favorable in a case where a micro electrode pattern or a specific shape is required.

Figure 5:
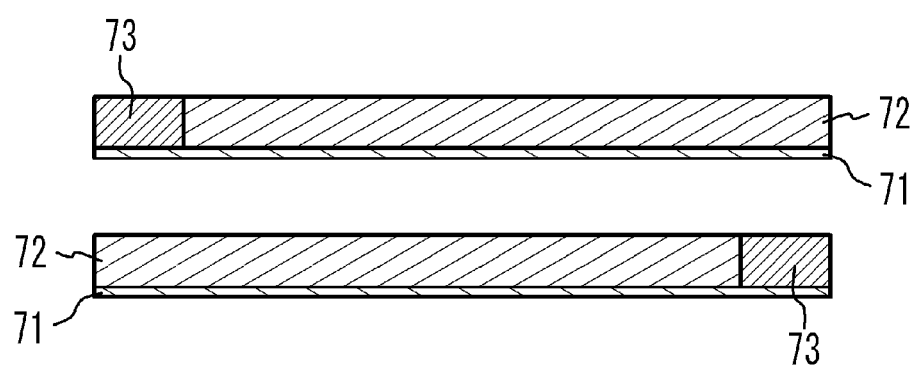
FIG. 5 illustrates a stacking process.

With respect to the all solid battery 100a described on the basis of FIG. 2, paste 72 for electrode layer is printed on one face of a green sheet 71 as illustrated in FIG. 5. A reverse pattern 73 is printed on a part of the green sheet 71 where the paste 72 for electrode layer is not printed. A material of the reverse pattern 73 may be the same as that of the green sheet 71. The green sheets 71 after printing are stacked so that each of the green sheets 71 is alternately shifted to each other. Thus, a multilayer structure is obtained. In this case, in the multilayer structure, each of the paste 72 for electrode layer is alternately exposed to the two edge faces of the multilayer structure.

(Firing process) Next, the obtained multilayer structure is fired. When the carbon material is used for the conductive auxiliary agent, it is preferable that an upper limit is determined in the oxygen partial pressure in the firing atmosphere, from a viewpoint of suppression of loss of the carbon included in the paste 72 of electrode layer. In concrete, it is preferable that the oxygen partial pressure in the firing atmosphere is $2 \times 10^{-13}$ atm or less. On the other hand, when the phosphoric acid salt-based solid electrolyte is used for the oxide-based solid electrolyte, it is preferable that a lower limit is determined in the oxygen partial pressure in the firing atmosphere, from a viewpoint of suppression of the melting of the phosphoric acid salt-based solid electrolyte. In concrete, the oxygen partial pressure in the firing atmosphere is $5 \times 10^{-22}$ atm or more. When the range of the oxygen partial pressure is determined in this manner, it is possible to suppress the carbon loss and the melting of the phosphoric acid salt-based solid electrolyte. An adjusting method of the oxygen partial pressure in the firing atmosphere is not limited.

After that, metal paste is applied to the two end faces of the multilayer chip 60. And, the metal paste is fired. Thus, the first external electrode 40a and the second external electrode 40b are formed. Alternatively, the multilayer chip 60 may be put in a dedicated tool so that the first external electrode 40a is spaced from the second external electrode 40b on the upper face, the lower face and the two side faces connected to the two end faces. And, electrodes may be formed by a sputtering. The first external electrode 40a and the second external electrode 40b may be formed by plating on the formed electrodes.

EXAMPLES

The all solid batteries in accordance with the embodiment were made and the property was measured.

(Example and comparative examples 1 to 4) $Co_3O_4$, $Li_2CO_3$, MAP (dihydrogen phosphate ammonium), $Al_2O_3$, and $GeO_2$ were mixed. As the powder of the solid electrolyte material, $Li_{1.3}Al_{0.3}Ge_{1.7}(PO_4)_3$ including Co was made by a solid-phase synthesis method. The resulting powder was dry-crushed by using $ZrO_2$ balls. Moreover, solid electrolyte slurry was made by wet-crushing (dispersion medium: ion exchanged water or ethanol). A binder was added to the resulting slurry. Thus, solid electrolyte paste was formed. And the green sheet was made from the solid electrolyte paste. $Li_{1.3}Al_{0.3}Ti_{1.7}(PO_4)_3$ including Co was made by the solid-phase synthesis method.

An electrode active material and a solid electrolyte material were highly dispersed by using a wet-type bead mil and so on. Tus, ceramic paste only including ceramic particles was made. Next, the ceramic paste was mixed with a conductive auxiliary agent. Thus, paste for internal electrode layer was made. $LiCoPO_4$ was used as the positive electrode active material. $Li_{1+x}Al_xTi_{2-x}(PO_4)_3$ was used as the negative electrode active material. In the example, the paste for internal electrode used for the positive electrode layer 10 and the paste for internal electrode used for the negative electrode layer 20 were made so that $S_{Cathode}$ was larger than $S_{Anode}$ after the firing. In the comparative example 1, the paste for internal electrode used for the positive electrode layer 10 did not include the negative electrode active material, and the paste for internal electrode used for the negative electrode layer 20 did not include the positive electrode layer 10. In the comparative example 2, the paste for internal electrode used for the positive electrode layer 10 and the paste for internal electrode used for the negative electrode layer 20 were made so that $S_{Anode}$ was larger than $S_{Cathode}$ after the firing. In the comparative examples 3 and 4, the paste for internal electrode used for the positive electrode layer 10 and the paste for internal electrode used for the negative electrode layer 20 were made so that $S_{Cathode}$ was equal to $S_{Anode}$ after the firing.

Next, a plurality of green sheets were stacked. The stacked green sheets were used as a solid electrolyte layer. The electrode sheets were stacked on both an upper face and a lower face of the solid electrolyte layer. The resulting structure was stamped into a rectangular board shape of □10 mm. The board shape structure was used as a sample. The samples were fired. The firing temperature was 700 degrees C. The oxygen partial pressure during the firing process was $10^{-13}$ atm or less at a temperature of 500 degrees C. or less.

The cross section of each of the all solid batteries of the example and the comparative examples 1 to 4 was observed by SEM-EDS mapping. Elements of the positive electrode active material and elements of the negative electrode active material were observed. Thus, the ratio $A_1$ of the positive electrode active material and the ratio $B_1$ of the negative electrode active material in the positive electrode layer 10 were measured. And the ratio $A_2$ of the positive electrode active material and the ratio $B_2$ of the negative electrode active material in the negative electrode layer 20 were measured. From the obtained values, $S_{Cathode}$ and $S_{Anode}$ were calculated. Table 1 shows the calculated values.

TABLE 1

| | STRUCTURE | $S_{Cathode}$ | $S_{Anode}$ | POLARITY OF SHORT-CIRCUIT TEST | CAPACITY (mAh) | TOTAL EVALUATION |
|---|---|---|---|---|---|---|
| COMPARATIVE EXAMPLE 1 | POLAR | 1.00 | 0.00 | X(POLAR) | ◉ | X |
| EXAMPLE | ASYMMETRY | 0.667 | 0.500 | ○(NON-POLAR) | ○ | ○ |
| COMPARATIVE EXAMPLE 2 | ASYMMETRY | 0.500 | 0.667 | ○(NON-POLAR) | X | X |

TABLE 1-continued

| | STRUCTURE | $S_{Cathode}$ | $S_{Anode}$ | POLARITY OF SHORT-CIRCUIT TEST | CAPACITY (mAh) | TOTAL EVALUATION |
|---|---|---|---|---|---|---|
| COMPARATIVE EXAMPLE 3 | SYMMETRY | 0.667 | 0.667 | ○(NON-POLAR) | X | X |
| COMPARATIVE EXAMPLE 4 | SYMMETRY | 0.500 | 0.500 | ○(NON-POLAR) | X | X |

As shown in Table 1, in the example, $S_{Cathode}$ was 0.667. $S_{Anode}$ was 0.500. In the comparative example 1, $S_{Cathode}$ was 1.00. $S_{Anode}$ was 0.00. In the comparative example 2, $S_{Cathode}$ was 0.500. $S_{Anode}$ was 0.667. In the comparative example 3, $S_{Cathode}$ and $S_{Anode}$ were 0.667. In the comparative example 4, $S_{Cathode}$ and $S_{Anode}$ were 0.500.

(Short-circuit test) Next, the short-circuit test was performed with respect to each of the all solid batteries of the example and the comparative examples 1 to 4. In the short-circuit test, polarity and non-polarity were confirmed. In concrete, when the discharge capacity of a sample subjected to the short-circuit test under the condition that polarity was correct was within ±5% of the discharge capacity of a sample subjected to the short circuit test under the condition that polarity was incorrect, the samples were determined as "non-polar" (good). When the discharge capacity of the sample subjected to the short-circuit test under the condition that polarity was correct was not within ±5% of the discharge capacity of the sample subjected to the short circuit test under the condition that polarity was incorrect, the samples were determined as "polar" (bad). Table 1 shows the results. As shown in Table 1, the all solid batteries of the example and the comparative examples 2 to 4 were determined as "non-polar". It is thought that this was because the positive electrode layer 10 and the negative electrode layer 20 include both the positive electrode active material and the negative electrode active material. On the other hand, the all solid battery of the comparative example 1 was determined as "polar". It is thought that this was because the positive electrode layer 10 did not include the negative electrode active material, and the negative electrode layer 20 did not include the positive electrode active material.

(Capacity test) Next, with respect of each of the all solid batteries of the example and the comparative examples 1 to 4, a capacity was measured in order to evaluate a forward reaction capacity with respect to an effective area. In concrete, values C (mAh·Ω), in which a discharge capacity (mAh) at (A−0.5)V was multiplied by a resistance value R(=ΔV/I) calculated from voltage changing ΔV just after starting of constant current charge at a current value I from open circuit voltage measurement, were measured. When the value C was more than 2500, the all solid battery was determined as very good. When the value C was more than 1000 and 2500 or less, the all solid battery was determined as good. When the value C was less than 1000, the all solid battery was determined as bad. Table 1 shows the results. As shown in Table 1, the all solid battery of the example was determined as good. It is thought that this was because $S_{Cathode}$ was larger than $S_{Anode}$, and the capacity was improved. On the other hand, the all solid batteries of the comparative examples 2 to 4 were determined as bad. It is thought that this was because $S_{Anode}$ was $S_{Cathode}$ or more, and sufficient capacity was not achieved. The all solid battery of the comparative example 1 was determined as very good. It is thought that this was because the positive electrode layer 10 did not include the negative electrode active material, and the negative electrode layer 20 did not include the positive electrode active material.

(Total Evaluation) With respect to each of the all solid batteries of the example and the comparative examples 1 to 4, when the all solid battery was not determined as "bad" in the short-circuit test and the all solid battery was not determined as "bad" in the capacity test, the all solid battery was determined as "good" in total evaluation. When the all solid battery was determined as "bad" in at least one of the short-circuit test and the capacity test, the all solid battery was determined as "bad" in the total evaluation. Table 1 shows the results. As shown in Table 1, the all solid battery of the example was determined as "good" in the total evaluation. It is thought that this was because the all solid battery was non-polar in the short-circuit test because the relationship "$S_{Cathode} \neq S_{Anode}$" was not satisfied, and the capacity of the all solid battery was improved because the relationship "$S_{cathode} > S_{Anode}$" was satisfied. On the other hand, the all solid batteries of the comparative examples 1 to 4 were determined as "bad" in the total evaluation. It is thought that the relationship "$S_{Cathode} > S_{Anode}$" was not satisfied.

Although the embodiments of the present invention have been described in detail, it is to be understood that the various change, substitutions, and alterations could be made hereto without departing from the spirit and scope of the invention.

What is claimed is:

1. An all solid battery comprising:
    a first electrode layer that includes a positive electrode active material and a negative electrode active material;
    a second electrode layer that includes a positive electrode active material and a negative electrode active material; and
    a solid electrolyte portion provided between the first electrode layer and the second electrode layer, a main component of the solid electrolyte portion being a oxide-based solid electrolyte,
    wherein the positive electrode active material of the first electrode layer and the positive electrode active material of the second electrode layer are $LiCoPO_4$,
    wherein the negative electrode active material of the first electrode layer and the negative electrode active material of the second electrode layer are $Li_{1+x}Al_xTi_{2-x}(PO_4)_3$ in which 0<x<2,
    wherein, when an area percentage of each of the first electrode layer and the second electrode layer in a cross section in a region observed by SEM in a stacking direction is 100%, an area ratio of the positive electrode active material of the first electrode layer in the cross section in the region observed by SEM in the stacking direction is a ratio $A_1$, an area ratio of the negative electrode active material of the first electrode layer in the cross section in the region observed by SEM in the stacking direction is a ratio $B_1$, an area ratio of the positive electrode active material of the second electrode layer in the cross section in the region observed by SEM in the stacking direction is a ratio $A_2$, a ratio of the negative electrode active material of the second electrode layer in the cross section in the region observed by SEM in the stacking direction is a ratio $B_2$, $S_{Cathode}$ is $A_1/(A_1+B_1)$, and $S_{Anode}$ is $A_2/(A_2+B_2)$, and wherein "$1>S_{Cathode}>0.6$" and "$0<S_{Anode}<0.6$" are satisfied.

2. The all solid battery as claimed in claim 1, wherein "$S_{Cathode}>0.667$" and "$S_{Anode}\leq 0.5$" are satisfied.

3. The all solid battery as claimed in claim 1, wherein the negative electrode active material of the first electrode layer and the negative electrode active material of the second electrode layer are $Li_{1.3}Al_{0.3}Ti_{1.7}(PO_4)_3$.

4. The all solid battery as claimed in claim 1, further comprising:
- a first external electrode that is connected to an end of the first electrode layer and is not connected to the second electrode layer;
- a second external electrode that is connected to an end of the second electrode layer and is not connected to the first electrode layer; and
- a mark for identifying the first external electrode and the second external electrode.

\* \* \* \* \*